US012689905B2

(12) United States Patent
Saini et al.

(10) Patent No.: US 12,689,905 B2
(45) Date of Patent: Jul. 21, 2026

(54) TRUST BASED CONTINUOUS 5G SERVICE ASSESSMENT

(71) Applicant: Cisco Technology, Inc., San Jose, CA (US)

(72) Inventors: Vinay Saini, Bangalore (IN); Namita Bist, Delhi (IN); Timothy P. Stammers, Raleigh, NC (US); Snezana Mitrovic, Leefdaal (BE)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 17/816,021

(22) Filed: Jul. 29, 2022

(65) Prior Publication Data

US 2024/0040383 A1 Feb. 1, 2024

(51) Int. Cl.
H04W 12/37 (2021.01)
H04W 12/06 (2021.01)
H04W 60/00 (2009.01)

(52) U.S. Cl.
CPC ........... H04W 12/37 (2021.01); H04W 12/06 (2013.01); H04W 60/00 (2013.01)

(58) Field of Classification Search
CPC ...... H04W 12/37; H04W 12/06; H04W 60/00
USPC .......................................................... 726/1
See application file for complete search history.

(56) References Cited

U.S. PATENT DOCUMENTS

| 11,863,579 B1 * | 1/2024 | Casillas ................. G06F 21/31 |
| 2016/0050234 A1 | 2/2016 | Choyi et al. |
| 2018/0013782 A1 * | 1/2018 | Choyi ................. H04L 63/1433 |
| 2018/0227871 A1 * | 8/2018 | Singh .................... H04W 48/18 |
| 2020/0137552 A1 | 4/2020 | Park et al. |
| 2020/0214054 A1 | 7/2020 | Qiao et al. |
| 2021/0099493 A1 | 4/2021 | Sun et al. |
| 2022/0030495 A1 * | 1/2022 | Qiao .................... H04W 60/04 |
| 2023/0171846 A1 * | 6/2023 | Cheng ................... H04W 76/50 |
| | | 455/404.1 |

FOREIGN PATENT DOCUMENTS

WO        2021151499 A1      8/2021

* cited by examiner

*Primary Examiner* — Bassam A Noaman
(74) *Attorney, Agent, or Firm* — Merchant & Gould P.C.

(57) ABSTRACT

A trust based continuous Fifth Generation (5G) network service assessment, and more specifically a trust based continuous 5G network service assessment for a user equipment to ensure an authorized user is using the user equipment may be provided. A registration request may be received by an Access and Mobility Management Function (AMF) from a User Equipment (UE). In response to the registration request, a Policy Control Function (PCF) may exchange a policy with the AMF, wherein the policy comprises instructions to perform a continuous service assessment. Next, a registration accept message may be sent to the UE, wherein the registration accept message comprises instructions for the UE to enable the continuous service assessment.

20 Claims, 6 Drawing Sheets

400

Continuous Service Assessment Information Element

402

Length

404

Activate

406

Fetch

500

Computing Device

510

Processing Unit

515

Memory

520

Software Module

525

Database

TRUST BASED CONTINUOUS 5G SERVICE ASSESSMENT

TECHNICAL FIELD

The present disclosure relates generally to providing a trust based continuous fifth generation (5G) network service assessment, and more specifically providing a trust based continuous 5G network service assessment for a user equipment to ensure an authorized user is using the user equipment.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
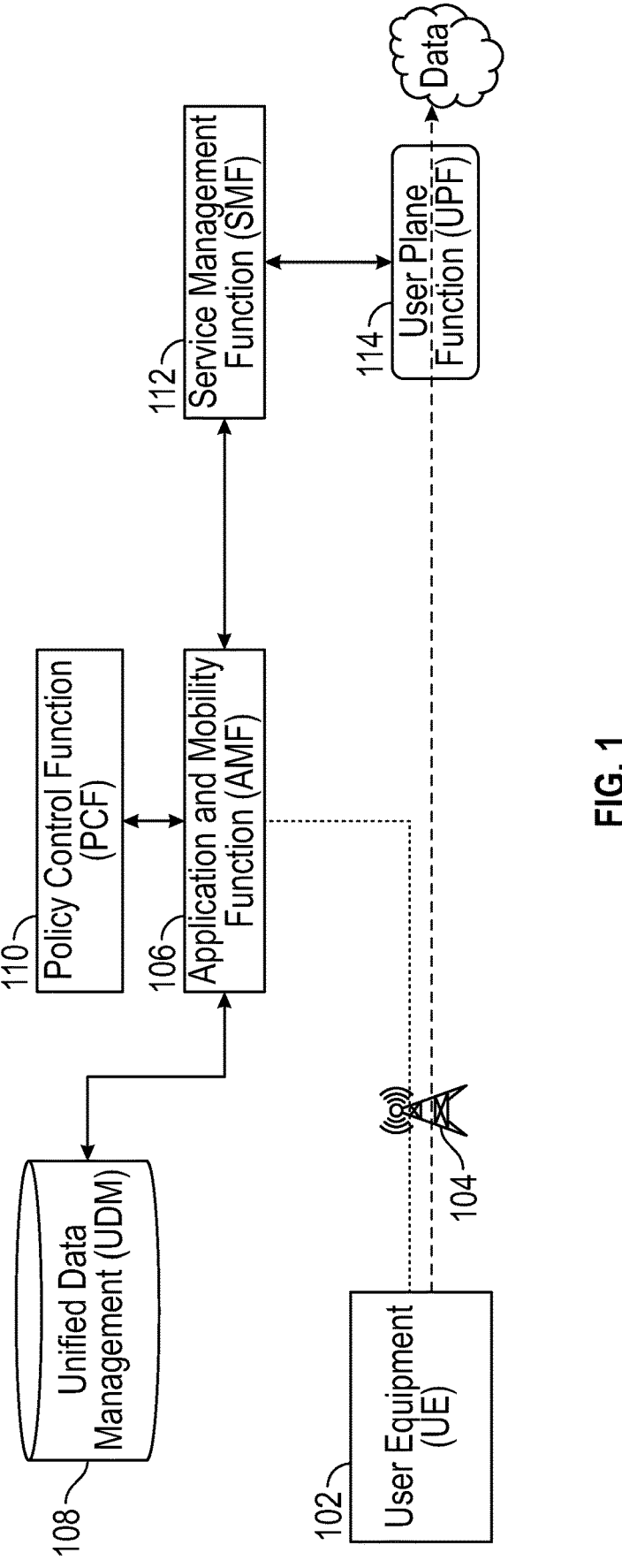
FIG. 1 is a block diagram of an operating environment for providing a trust based continuous service assessment for a user equipment connecting to a fifth generation network.

A trust based continuous fifth generation (5G) network service assessment, and more specifically a trust based continuous 5G network service assessment for a user equipment to ensure an authorized user is using the user equipment may be provided. A registration request may be received by an Access and Mobility Management Function (AMF) from a User Equipment (UE). In response to the registration request, a Policy Control Function (PCF) may exchange a policy with the AMF, wherein the policy comprises instructions to perform a continuous service assessment. Next, a registration accept message may be sent to the UE, wherein the registration accept message comprises instructions for the UE to enable the continuous service assessment.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When connecting to a 5G network, the processes for onboarding and granting access to certain services depends on one-time authentication and authorization. However, the processes may not continuously validate the state of a machine and/or user. For example, when a user besides an authorized user uses a machine, a machine does not operate as expected and/or the machine is tampered with (e.g., a SIM card is removed from the machine and inserted into a different machine), there may be no mechanism to dynamically reauthorize the device or alter the service access levels associated with the machine.

FIG. 1 is a block diagram of an operating environment 100 for providing a trust based continuous service assessment for a UE 102 connecting to a 5G network. The operating environment includes the UE 102, a Radio Access Network (RAN) 104, an Application and Mobility Function (AMF) 106, a Unified Data Management (UDM) 108, a Policy Control Function (PCF) 110, a Service Management Function (SMF) 112, an Authentication Server Function, and a User Plane Function (UPF) 114.

The UE 102 may connect to the network via the RAN 104, such as to communicate with the AMF 106 and the UPF 114. The UDM 108 may manage network user data. The UDM 108 may send a subscription profile to the AMF 106 for use in the trust based continuous service assessment for the UE 102. The subscription profile may be used to determine the access authorization, registration management, and the like for the UE 102. The PCF 110 may provide a policy that includes policy information, such as for network slicing, roaming, and mobility management. The PCF 110 may provide policy information for the UE 102 based on the kind of device the UE 102 is and/or the identity of the authorized user of the UE 102. The AMF 106 may handle connection and mobility management tasks, such as allowing the UE 102 to access the SMF 112, the UPF 114, and/or other components of the network core.

The UE 102 may initially register to connect to the network. The AMF 106 may handle the initial registration and authorize the UE 102 access to one or more services provided by the network. Additionally, the AMF 106 may instruct the UE 102 to enable or otherwise perform a continuous assessment of the UE 102 and/or a user of the UE in a Trusted Execution Environment (TEE) to determine if the UE 102 is the same device as the device that was initially registered and/or the user is an authorized user or not. For example, the continuous assessment may be a continuous multi factor authorization procedure. The AMF 106 may instruct the UE 102 to perform the continuous assessment based on the policy associated with UE 102 retrieved from the PCF 110.

The UE 102 may send the results of the continuous assessment to the AMF 106 periodically. The AMF 106 may reauthorize the UE 102 to access the authorized services of the network if the results of the continuous assessment indicate that the UE 102 is the same device as the device that was initially registered and/or the user is an authorized user. The AMF 106 may evaluate whether a trust score indicates that the user is an authorized user and/or the UE 102 is the same device. The trust score may be generated when the AMF 106 authorizes the UE 102, and the trust score may degrade over time. The trust score may indicate the UE 102 is authorized for a period until the trust score degrades and moves below a threshold. Once the trust score moves below the threshold, the AMF 106 may determine that the UE 102 needs to be reauthorized to determine if the UE 102 is the same device and/or if the user is an authorized user. The AMF 106 may store the trust scores received by the UE 102 and monitor the trust scores to determine when the trust scores move below the threshold.

If the UE 102 is not reauthorized, the UE 102 may be unable to access certain services after a period of time has elapsed. The AMF 106 may suspend services, terminate access to services, reduce an access level for services, and the like when the UE 102 is not reauthorized after the period of time. For example, the authorized user of the UE 102 may be authorized to access more services than another user of the UE 102, such as financial services and other secure services. The AMF 106 may also restrict access to a network slice when the user is not the authorized user, block secure identity messages (e.g., sign in verification messages sent to the UE 102), and block services and/or mark the UE 102 as stolen based on a threshold set by the user.

For the continuous service assessment, the UE 102 may collect and analyze biometric information of a user that is currently using the UE 102 to determine if the current user is the authorized user. The biometric information may include fingerprints, palm veins, facial recognition, palm prints, hand geometry, iris recognition, retina recognition, and the like. The UE 102 may analyze the biometric data to determine if the biometric data indicates that the authorized user is using the UE 102.

The UE 102 may additionally collect and analyze behavior characteristics of an authenticated user using the UE 102. For example, the UE 102 may determine how the UE 102 is typically used by the authenticated user to create expected behavior characteristics, and the UE 102 may analyze how the UE 102 is subsequently used to determine if the usage of the UE 102 is being used as expected based on the expected behavior characteristics. The behavior characteristics may include the user's gait, typing rhythm, device interaction behaviors (e.g., (i) device positioning, (ii) device usage such as time spent using applications, time the device is typically used, and the like, (iii) behavior when interacting with a touch screen such as swiping, tapping, etc.), and the like.

The UE 102 may determine that the authorized user is using the UE 102 based on the comparison between the current usage of the UE 102 and the expected behavior characteristics. The UE 102 may send a message indicating that the authorized user is has be verified as the user using the UE 102 to extend the validation of the user based on this comparison. For example, the message may include the trust score determined by the UE 102. Therefore, the UE 102 may send a message to renew the trust score based on the behavior characteristics analysis and/or the biometric information. The AMF 106 may request the UE 102 to send an updated trust score in response to events such as when a new network slice is assigned, quota management, and the like.

The UE 102 may perform the continuous assessment of the UE 102 user by determining a trust score that indicates a probability that the current user is the authorized user using the biometric data and/or the behavioral characteristics comparison. The UE 102 may send the trust score to the AMF 106, and the AMF 106 may compare the trust score to a set threshold to determine to initiate reauthorization for the UE 102 or not. For example, the trust score may indicate that the probability the current user is the authorized user is ninety percent, and the threshold may be eighty percent. Therefore, the AMF 106 may determine that the UE 102 does not require reauthorization in this example because the trust score is still above the threshold. Alternatively, if the trust score indicates the probability is sixty percent, the AMF 106 may determine to initiate the reauthorization for the UE 102 because the UE 102 may not be used by an authorized user and/or the UE 102 may not be the same device. In another example, the trust score may be a binary score that may indicate that the UE 102 has determined that the current user may be the authorized user or determined that the current user may not be the authorized user. Thus, the AMF 106 may initiate reauthorization for the UE 102 when the trust score indicates that the UE 102 has determined that the current user may not be the authorized user.

The biometric information and behavior characteristics may be stored, processed, and protected by the UE 102 in the TEE to ensure that the personal information is not inadvertently shared with other devices. The UE 102 may send a message indicating when the UE 102 receives valid biometric information and/or establishes the identity of the user based on the behavior characteristics comparison. Thus, the UE 102 may not need to send the collected biometric information or behavior characteristics for the continuous trust based service assessment. Because the biometric information is not shared with any other component, the personal information of the user associated with the biometric information may remain protected.

Additionally, the trust score may also indicate whether the UE 102 is the expected device that is associated with access to the network services and/or there is a second trust score specifically to indicate if the UE 102 is the expected device. The UE 102 may collect, store, and/or share device information. The device information may include device type (e.g., mobile device, server, personal computer), device software, device applications, vibration, heat, running time, device specifications (e.g., GPU, CPU, RAM, storage), and the like. When the UE 102 is initially registered, the expected device information may be collected and shared with the network to be stored, such as by the UDM 108. The UE 102 and/or the components of the network, such as AMF 106, may compare current device information with the expected device information to determine whether the UE 102 is the same device that was initially registered. When the AMF 106 is performing the comparison, the UDM 108 may share the expected device information with the AMF 106. Thus, in some examples, the trust score and/or a second trust score may be updated to indicate whether the UE 102 is the same device that was initially registered or not. The AMF 106 may determine whether to initiate reauthorization of the UE 102 based on the trust score and/or the second score. When the AMF 106 is performing the comparison, the AMF 106 may not generate or update a trust score associated with the device and determine whether to initiate the reau-thorization based on the comparison and the trust score associated with the biometric information and/or the behavior characteristics.

The AMF 106 may reduce the value of the trust score or the trust score may otherwise decay based on how long ago the trust score was generated. For example, the trust score may have been generated an hour ago, and the value of the trust score may be reduced because a different user may be using the UE 102 now that an hour has elapsed. For example, if the trust score had a value of ninety percent, the AMF 106 may reduce the value to seventy percent based on the hour passing since the score was generated. The AMF 106 may request the UE 102 to send an updated trust score when the present trust score degrades towards or goes below the threshold.

The UE 102 may send a trust score any time the results indicate that the user is an authorized user and/or the UE 102 is the same device that initially registered. For example, the threshold may be a value of sixty. Thus, any time the UE 102 generates a trust score of sixty or higher, the UE 102 may send the trust score to the AMF 106. Therefore, the UE 102 may send a trust score periodically, any time the results indicate that the user is an authorized user and/or the UE 102 is the same device that initially registered, and/or any time the AMF 106 requests a trust score. As a result, the AMF 106 may receive a trust score that is above a threshold before a period has elapsed when the user is an authorized user and/or the UE 102 is the same device that initially registered. The UE 102 may therefore not require reauthorization, and the UE 102 can continue to access all authorized services while the user is an authorized user and/or the UE 102 is the same device that initially registered.

Figure 2:
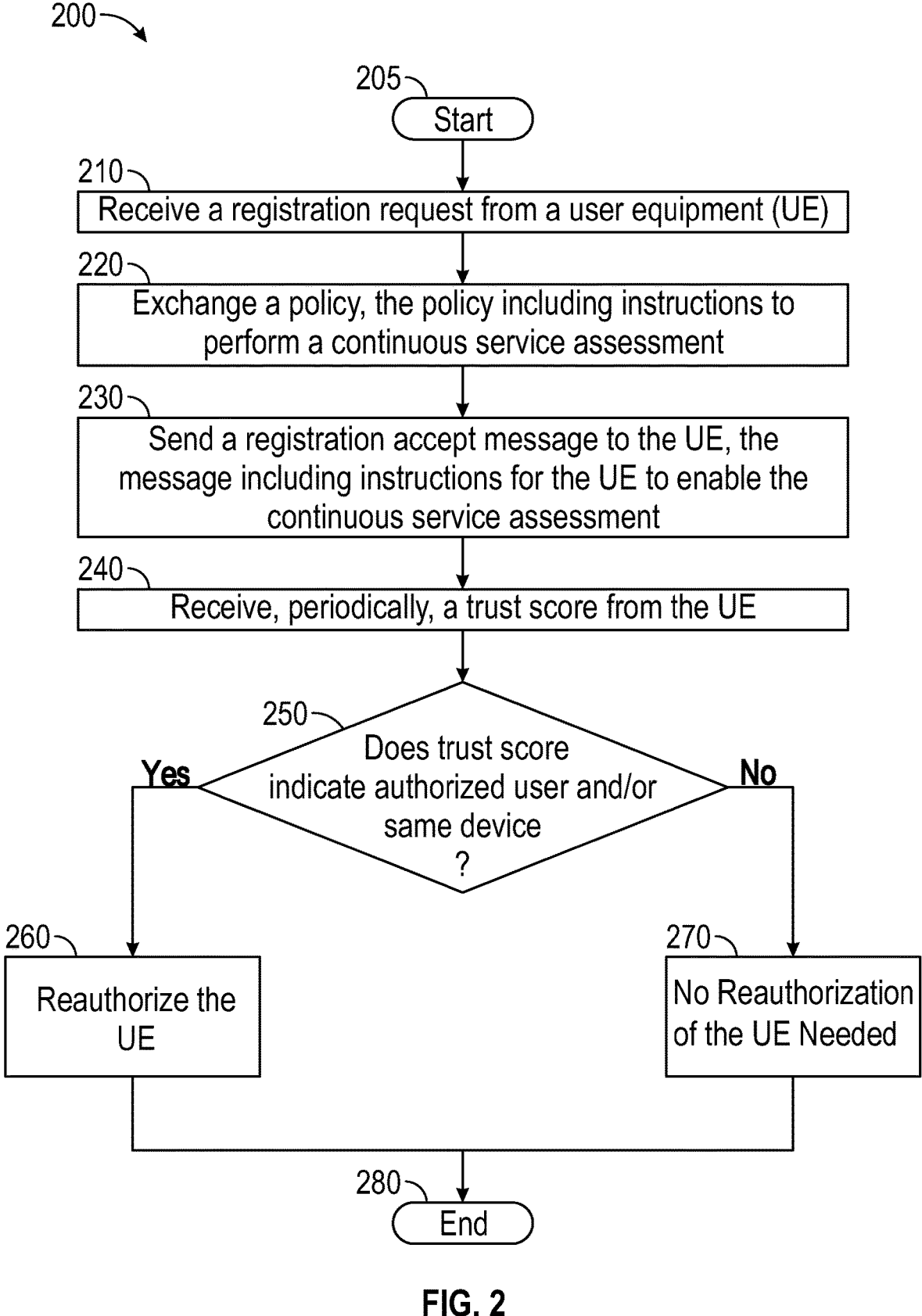
FIG. 2 is a flow chart of a method for providing trust based continuous service assessment for a user equipment connecting to a network.

FIG. 2 is a flow chart of a method 200 for providing trust based continuous service assessment for a UE connecting to a network. The method 200 begins at starting block 205 and proceeds to operation 210, where a registration request from a UE is received. For example, an AMF, such as AMF 106 shown in FIG. 1, receives the request from a UE, such as UE 102, via a RAN.

In response to receiving the request, a policy is exchanged in operation 220. The policy may include instructions to perform a continuous service assessment. For example, the AMF receives the policy with instructions to perform the continuous service assessment from a PCF, such as PCF 110 shown in FIG. 1.

Once the policy is received, a registration accept message may be sent to the UE in operation 230, and the registration accept message includes instructions for the UE to enable the continuous based service assessment. For example, the AMF may send the registration accept message to the UE via the RAN. The registration accept message may include the policy and any other information necessary for the UE to begin connecting to the network. The registration accept message may include a continuous service assessment infor-mation element (IE), and the continuous service assessment IE may include instructions for the UE to enable the con-tinuous service assessment, a length of time before reautho-rization is required, a fetch field for the AMF to request the UE to send a trust score, and/or and information and fields for the UE to perform the continuous service assessment. The continuous service assessment IE will be explained in more detail herein with respect to FIG. 4.

In operation 240, a trust score is received, such as by the AMF, from the UE. The trust score may be the result of the continuous based service assessment. The trust score may be updated every time the trust score is sent to the AMF.

In operation 250, it is determined, such as by the AMF, whether the trust score indicates whether the user of the UE is an authorized user and/or whether the UE is the same device that sent the registration request in operation 210. For example, the AMF may compare the trust score to a thresh-old to determine whether the trust score indicates whether the user of the UE is an authorized user and/or whether the UE is the same device that sent the registration request. The trust score may have a value of eighty, and the threshold may have a value of seventy-five. In this example, the AMF may determine that the trust score indicates the user of the UE is an authorized user and/or the UE is the same device that sent the registration request.

If it determined that the trust score indicates the user is not the authorized user and/or the UE is not the same device that sent the registration request, the method 200 may proceed to operation 260. In operation 260, the UE may be reautho-rized. For example, the AMF 106 reauthorizes the UE 102. If reauthorization is successful, the UE 102 may receive or generate a new trust score that is above the threshold. If the reauthorization fails, the UE authorization to access services of the network may be altered after a period. For example, the AMF 106 may suspend services, terminate access to services, reduce an access level for services, and the like when the UE 102 is not reauthorized after the period of time.

In some examples, the AMF may request and/or receive a subsequent trust score that indicates the user is an autho-rized user and/or the UE device is the same device that sent the registration request. Therefore, the UE may eventually be reauthorized. In an example, the AMF receives the subsequent trust score before the period of time has elapsed. Therefore, the UE authorization may not be altered if the subsequent trust score indicates that the user is the autho-rized user and/or the device is the same device that sent the registration message. Additionally, the method 200 may return to operation 240 to wait for a trust score that allows the method to proceed to operation 270, where the UE authorization can be reauthorized after the UE authorization was altered in operation 260.

If it determined that the trust score indicates the user is the authorized user and/or the UE is the same device that sent the registration request, the method 200 proceeds to opera-tion 270. In operation 270, the UE may not be reauthorized. For example, the AMF 104 determines that the UE 102 does not need to be reauthorized. The method 200 may return to operation 240, so the AMF can continue to determine whether to alter the UE authorization in operation 260 or to again reauthorize the UE in operation 270. The method 200 concludes at ending block 280.

Figure 3A:
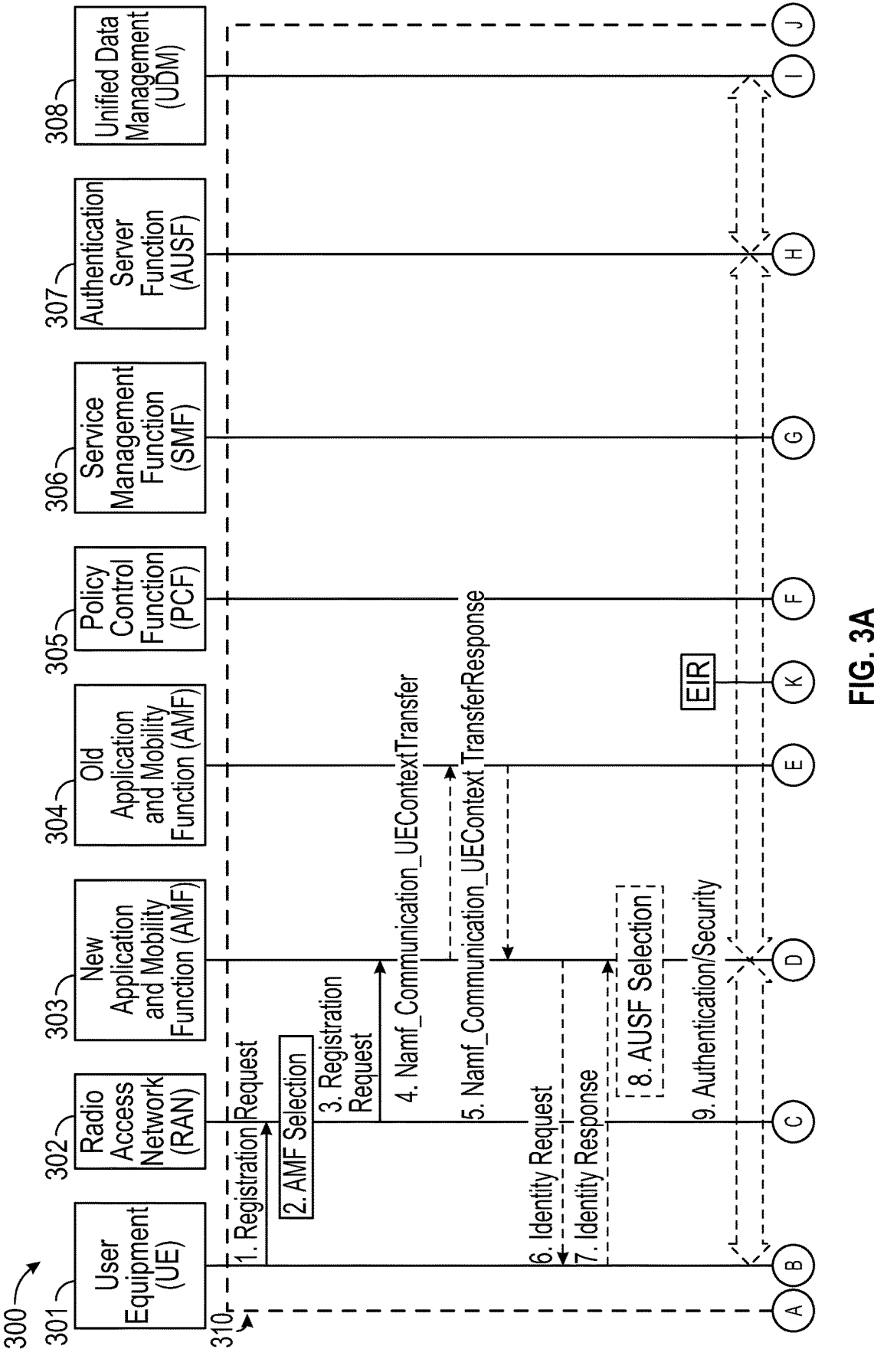
FIG. 3A, FIG. 3B, and FIG. 3C is a signaling process between a user equipment, a Radio Access Network, a new Application and Mobility Function, an old Application and Mobility Function, a Policy Control Function, a Service Management Function, an Authentication Server Function, and a Unified Data Management for providing trust based continuous service assessment for a user equipment connecting to a fifth generation network.
Figure 3B:
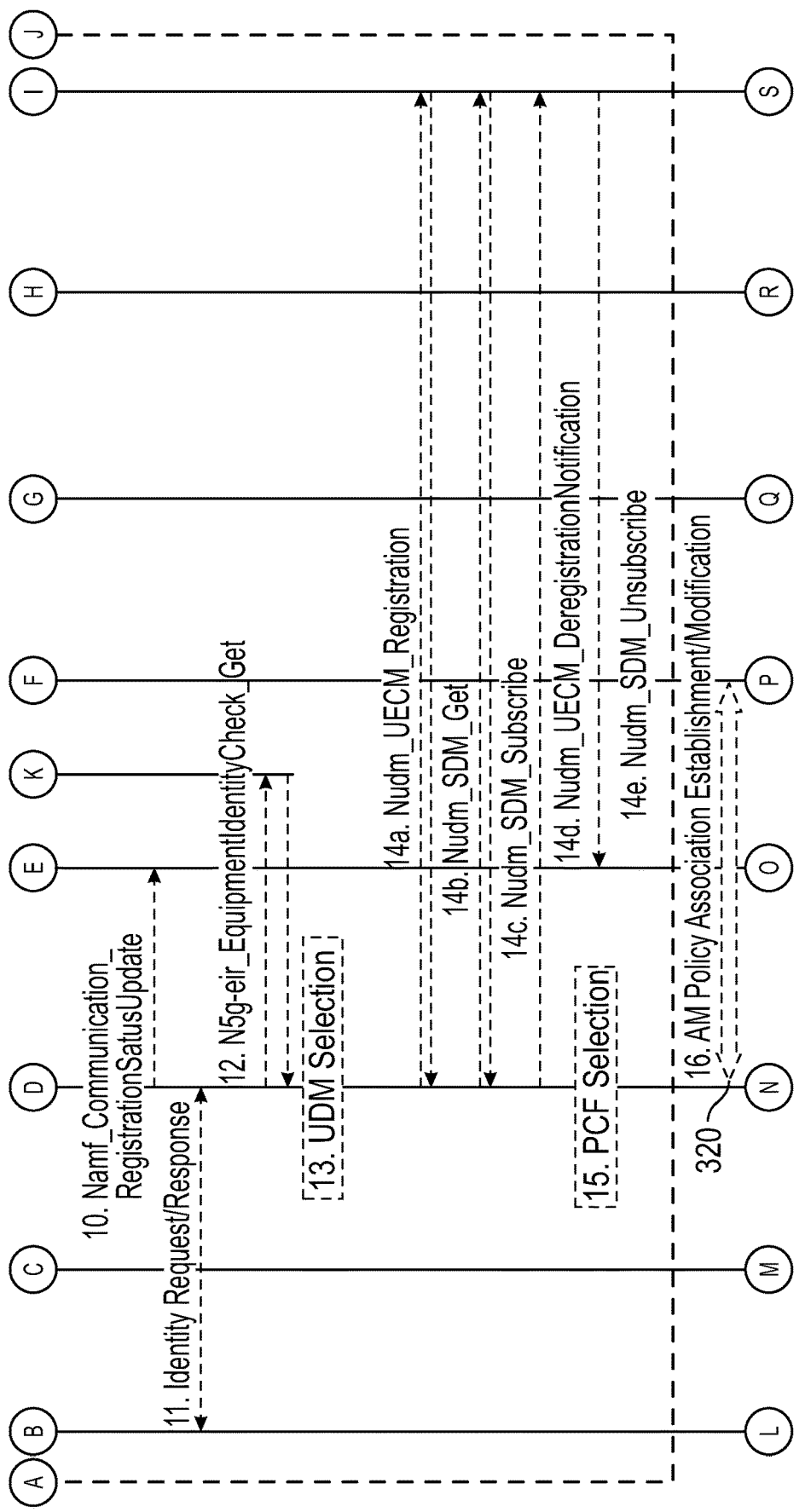
Figure 3C:
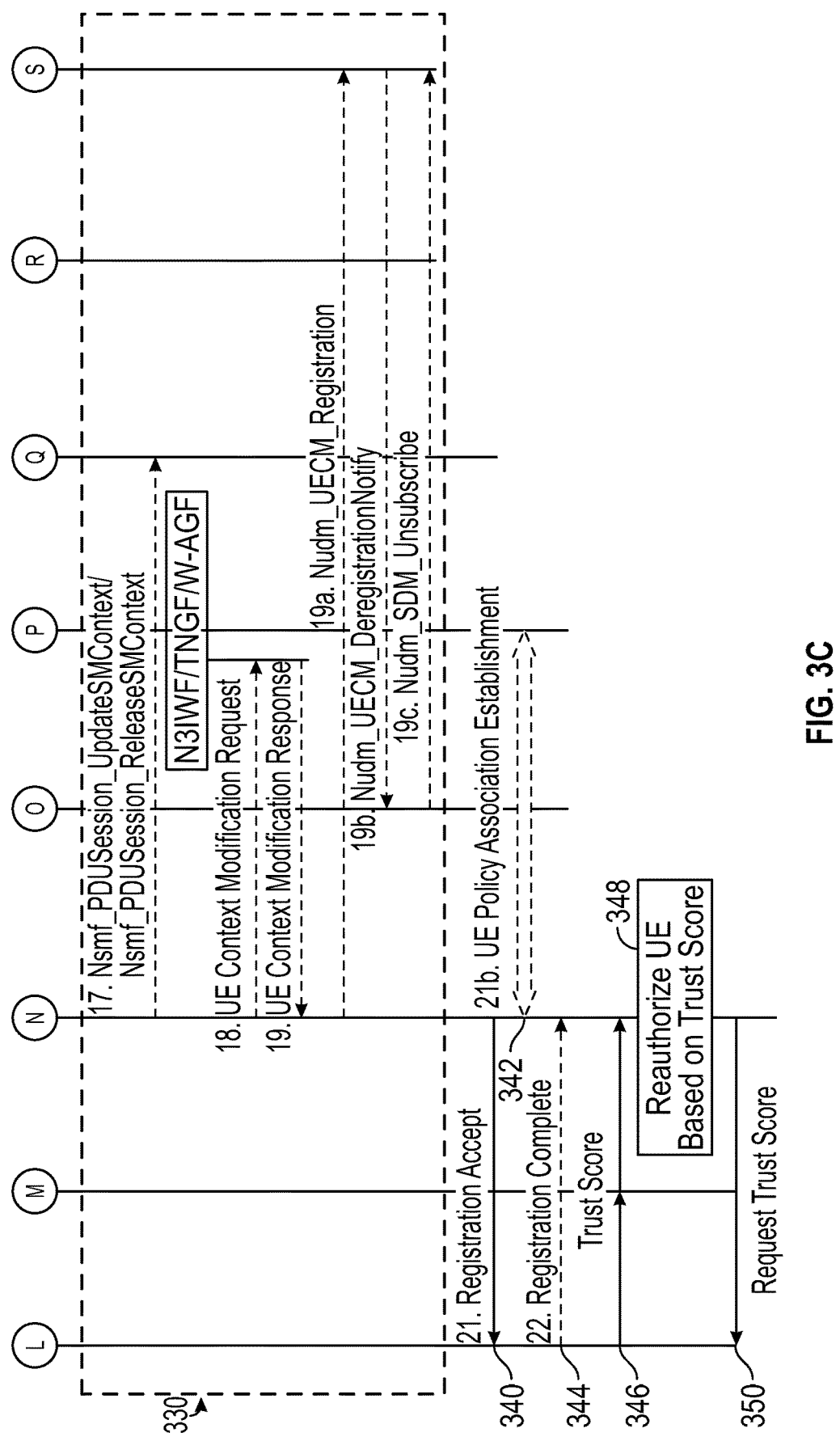

FIG. 3A, FIG. 3B, and FIG. 3C illustrate a signaling process 300 between a UE 301, a RAN 302, a new AMF 303, an old AMF 304, a PCF 305, a SMF 306, an Authen-tication Server Function (AUSF) 307, and a UDM 308 for providing trust based continuous service assessment for the UE 301 connecting to a 5G network.

The signaling process begins in FIG. 3A with initial registration signals 310. The initial registration signals 310 may include the UE 301 sending a registration request. The registration request may be received by the new AMF 303. Additionally, the initial registration signals 310 may include the UE 301 sending device information and/or authorized user information. The PCF may receive the device information and/or authorized user information. The initial registration signals 310 may include additional signals necessary for the initial registration request of the UE 301.

In signal 320, the new AMF 304 and the PCF 305 may exchange a policy, and the policy may include instructions for the UE 301 to perform a continuous service assessment. Registration initiation signals 330 may include signals sent between the new AMF 303, the PCF 305, the SMF 306, and/or the UDM 308 to finalize the registration of the UE 301.

In signal 340, the UE 301 may receive a registration accept message, and the registration accept message includes instructions for the UE 301 to enable the continuous service assessment. The registration accept message may include a continuous service assessment IE that includes the instructions for the UE 301 to enable the continuous service assessment and any information necessary for the UE 301 to perform the assessment. In signal 342, the new AMF 303 may receive instructions to handle the continuous service assessment of the UE 301, such as to trigger reauthorization of the UE 301 when the new AMF 303 receives a trust score that indicates the UE 301 should be reauthorized, send fetch requests to the UE 301 for the UE 301 to send a trust score, and the like. In signal 344, the UE 301 may send a registration complete message to the new AMF 303. The registration complete message may notify the new AMF 303 that the registration was successful, and the UE 301 is performing the continuous service assessment.

In signal 346, the UE 301 may send a trust score to the new AMF 303. The UE 301 may send the trust score periodically. In operation 348, the new AMF 303 may analyze the trust score and determines whether to reauthorize the UE 301.

In signal 350, the new AMF 303 may instruct the UE 301 to send an updated trust score. For example, the new AMF 303 may send the UE 301 a message to change the value of a fetch field of the continuous service assessment IE, indicating to the UE 301 to send a trust score to the new AMF 303.

Figure 4:
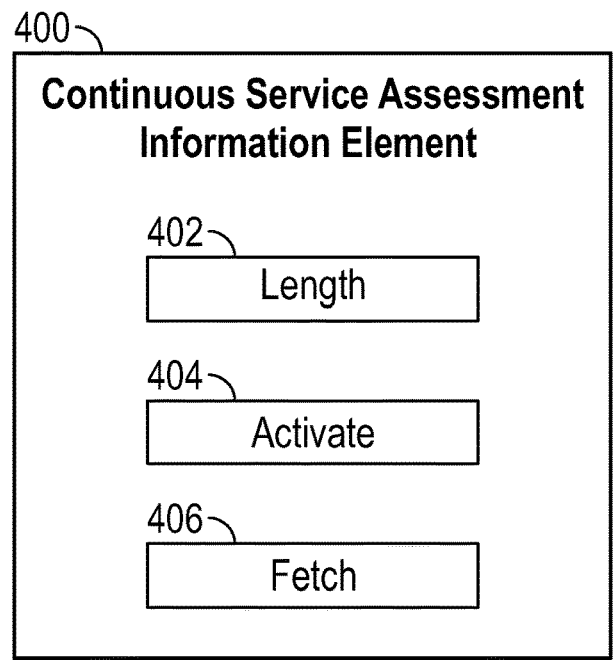
FIG. 4 is a block diagram of a continuous service assessment information element.

FIG. 4 is a block diagram of a continuous service assessment IE 400. The continuous service assessment IE 400 includes a length field 402, an activate field 404, and a fetch field 406. The length field 402 may indicate the period a UE is authorized to access certain services without being reauthorized. The activate field 404 may indicate whether the UE should perform a continuous service assessment. The fetch field 406 may indicate whether the UE should send a trust score to an AMF.

The continuous service assessment IE 400 may be sent to a UE via a registration accept message during the initial registration process. The continuous service assessment IE 400 may be updated by an AMF by sending instructions to the UE. For example, the AMF may request a trust score by sending a message that changes the value of the fetch field 406.

Figure 5:
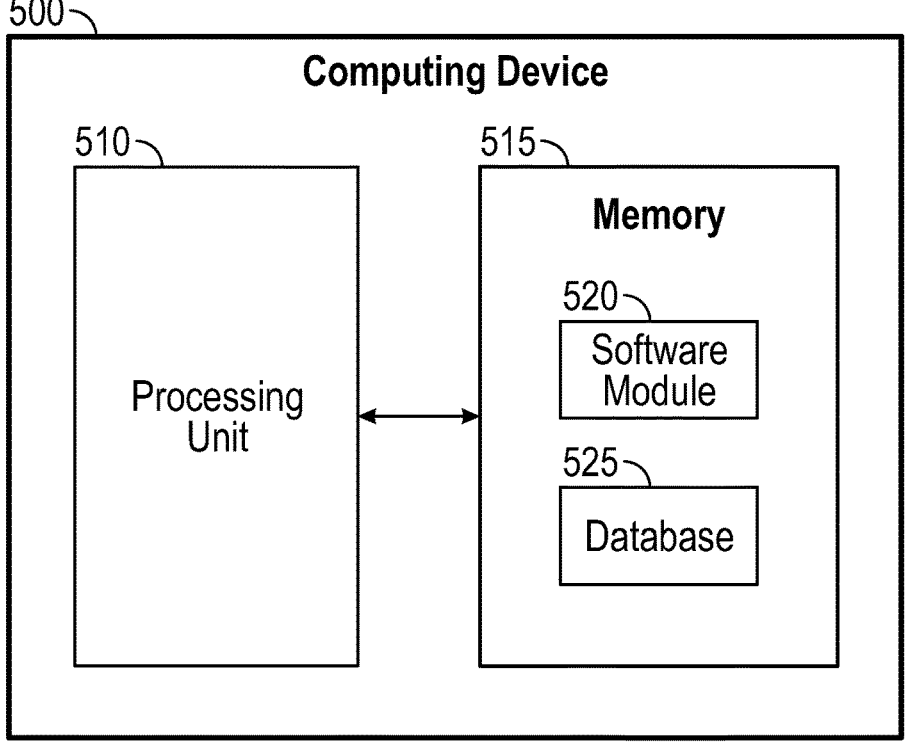
FIG. 5 is a block diagram of a computing device.

FIG. 5 is a block diagram of a computing device. As shown in FIG. 5, computing device 500 may include a processing unit 510 and a memory unit 515. Memory unit 515 may include a software module 520 and a database 525. While executing on processing unit 510, software module 520 may perform, for example, processes for providing a trust based continuous service assessment for UEs as described above with respect to FIG. 1, FIG. 2, and FIG. 3. Computing device 500, for example, may provide an operating environment for the UE 102, the RAN 104, the AMF 106, the UDM 108, the PCF 110, the SMF 112, the UPF 114, the UE 301, the RAN 302, the new AMF 303, the old AMF 304, the PCF 305, the SMF 306, the AUSF 307, the UDM 308, and/or any other system described herein. The UE 102, the RAN 104, the AMF 106, the UDM 108, the PCF 110, the SMF 112, the UPF 114, the UE 301, the RAN 302, the new AMF 303, the old AMF 304, the PCF 305, the SMF 306, the AUSF 307, the UDM 308, and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, by an Access and Mobility Management Function (AMF), a registration request from a user equipment (UE) to connect to a Radio Access Network (RAN);
in response to the registration request, a Policy Control Function (PCF) exchanging a policy with the AMF, wherein the policy comprises instructions to perform a continuous service assessment; and
sending a registration accept message comprising a continuous service assessment information element (IE) to the UE, wherein the continuous assessment of the registration accept message comprises an activate field comprising instructions for the UE to enable the continuous service assessment, a fetch field indicating whether the UE has to send the trust score to the AMF, and a length field indicating a period the UE is authorized to access certain services without being reauthorized,
wherein the UE, in response to enabling the continuous service assessment is configured to:
determine biometric information and behavior characteristics of a current user of the UE,
compare the determined biometric information and the determined behavior characteristics with an expected biometric information and an expected behavior characteristic of the current user of the UE,
determine a trust score based on comparing the determined biometric information and the determined behavior characteristics with the expected biometric information and the expected behavior characteristic of the current user of the UE, wherein the expected biometric information is collected when the UE was initially registered, and
send the trust score to the AMF when the trust score is below a predetermined range.

2. The method of claim 1, further comprising:
receiving, by the AMF, the trust score from the UE; and
comparing, by the AMF, the trust score to a threshold.

3. The method of claim 2, further comprising, altering, by the AMF, an authorization of the UE when the trust score is below the threshold and a period has elapsed.

4. The method of claim 2, further comprising, reauthorizing, by the AMF, the UE when the trust score is below the threshold.

5. The method of claim 1, further comprising:
sending a trust score request to the UE; and
receiving, by the AMF, the trust score from the UE.

6. The method of claim 1, wherein the UE, in response to enabling the continuous service assessment, is configured to monitor another trust score to indicate when the UE is a same device that was initially registered.

7. The method of claim 6, wherein the another trust score is determined as:
determining a current device information of the UE,
comparing the current device information with an expected device information collected when the UE was initially registered, and
determining the another trust score based on the comparing the current device information with the expected device information collected when the UE was initially registered.

8. The method of claim 1, wherein determining the biometric information comprises one or more of:
collecting fingerprints,
collecting facial recognition,
collecting retina recognition, and
collecting palm prints.

9. The method of claim 1, wherein the UE sends the trust score based on a value of the fetch field.

10. The method of claim 9, further comprising: requesting, by the AMF, the trust score by sending a message that changes the value of the fetch field.

11. A system comprising:

a memory storage; and a processor coupled to the memory storage, wherein the processor is operative to:

receive a registration request from a user equipment (UE);

in response to the registration request, exchange a policy with a Policy Control Function (PCF), wherein the policy comprises instructions to perform a continuous service assessment; and send a registration accept message comprising a continuous service assessment information element (IE) to the UE, wherein the continuous assessment of the registration accept message comprises an activate field comprising instructions for the UE to enable the continuous service assessment, a fetch field indicating whether the UE has to send the trust score to the AMF, and a length field indicating a period the UE is authorized to access certain services without being reauthorized, wherein the UE, in response to enabling the continuous service assessment is configured to:

determine biometric information and behavior characteristics of a current user of the UE, compare the determined biometric information and the determined behavior characteristics with an expected biometric information and an expected behavior characteristic of the current user of the UE, determine a trust score based on comparing the determined biometric information and the determined behavior characteristics with the expected biometric information and the expected behavior characteristic of the current user of the UE, wherein the expected biometric information is collected when the UE was initially registered, and send the trust score to the AMF when the trust score is below a predetermined range.

12. The system of claim 11, wherein the processor is further operative to:

receive the trust score from the UE; and compare the trust score to a threshold.

13. The system of claim 12, wherein the processor is further operative to, alter an authorization of the UE when the trust score is below the threshold and a period has elapsed.

14. The system of claim 12, wherein the processor is further operative to, reauthorize the UE when the trust score is below the threshold.

15. The system of claim 11, wherein the processor is further operative to:

send a trust score request to the UE; and receive the trust score from the UE.

16. A non-transitory computer-readable medium that stores a set of instructions which when executed perform a method executed by the set of instructions comprising:

receiving, by an Access and Mobility Management Function (AMF), a registration request from a user equipment (UE);

in response to the registration request, a Policy Control Function (PCF) exchanging a policy with the AMF, wherein the policy comprises instructions to perform a continuous service assessment; and sending a registration accept message comprising a continuous service assessment information element (IE) to the UE, wherein the continuous assessment of the registration accept message comprises an activate field comprising instructions for the UE to enable the continuous service assessment, a fetch field indicating whether the UE has to send the trust score to the AMF, and a length field indicating a period the UE is authorized to access certain services without being reauthorized, wherein the UE, in response to enabling the continuous service assessment is configured to:

determine biometric information and behavior characteristics of a current user of the UE, compare the determined biometric information and the determined behavior characteristics with an expected biometric information and an expected behavior characteristic of the current user of the UE, determine a trust score based on comparing the determined biometric information and the determined behavior characteristics with the expected biometric information and the expected behavior characteristic of the current user of the UE, wherein the expected biometric information is collected when the UE was initially registered, and send the trust score to the AMF when the trust score is below a predetermined range.

17. The non-transitory computer-readable medium of claim 16, further comprising:

receiving, by the AMF, the trust score from the UE; and comparing, by the AMF, the trust score to a threshold.

18. The non-transitory computer-readable medium of claim 17, further comprising, altering, by the AMF, an authorization of the UE when the trust score is below the threshold and a period has elapsed.

19. The non-transitory computer-readable medium of claim 17, further comprising, reauthorizing, by the AMF, the UE when the trust score is below the threshold.

20. The non-transitory computer-readable medium of claim 16, further comprising to:

send a trust score request to the UE; and receive the trust score from the UE.

* * * * *